May 20, 1941.                L. J. MISURACA                2,242,475
                          MOTORIZED HAND TOOL
                          Filed July 14, 1939
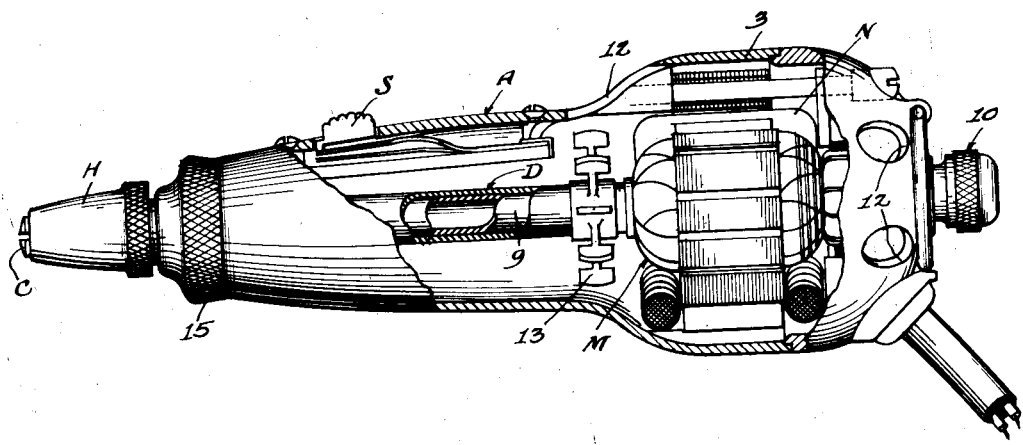
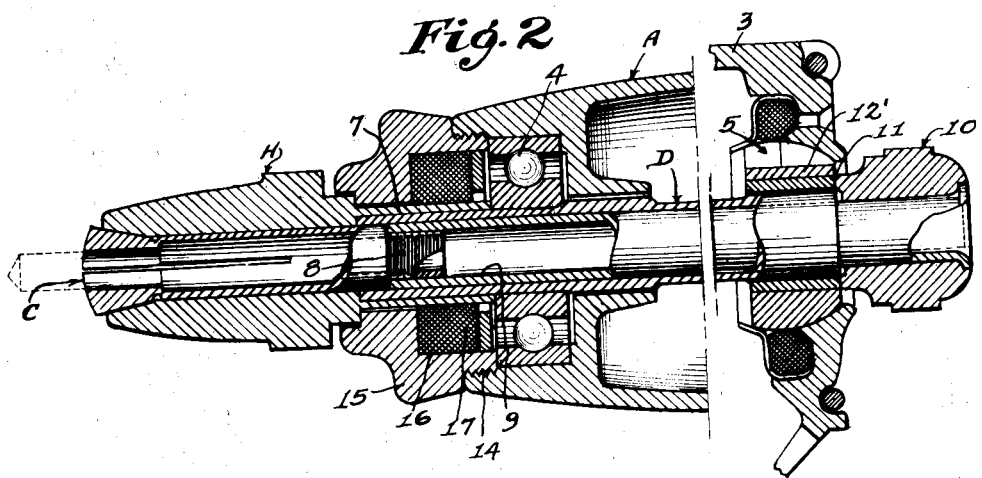
INVENTOR.
Louis J. Misuraca,
BY Luther L. Mack
ATTORNEY.

Patented May 20, 1941

2,242,475

UNITED STATES PATENT OFFICE 2,242,475

MOTORIZED HAND TOOL

Louis J. Misuraca, Glendale, Calif.

Application July 14, 1939, Serial No. 284,567

5 Claims. (Cl. 172—36)

My invention has for its primary purpose the provision of a small and compact motor-operated hand tool which is characterized by parts and elements of novel construction and arrangement affording a more convenient and efficient operation of small circular saws, grinding wheels, cutters, abrasive elements, burs, drills, and many similar rotary implements or tools.

One of the purposes of my invention is to provide a motorized hand tool or device such as described which will afford a most effective use of implements hereinbefore named and implements of greater length than the chuck and also make possible a concentric holding and a more convenient releasing and clamping of the implement, all by reason of the use of a motor having an axial bore therethrough, a chuck at one end of the device in alignment with said bore, and a chuck releasing and setting means operable at the other end of said device and extending through said bore without interfering with the positioning and longitudinal adjustment of an elongated implement in said bore. By reason of these arrangements, the implement may be inserted into the chuck from either end thereof and where the implement is longer than the chuck it may be extended into or through said bore, yet is subject to being readily released or gripped by the chuck upon manipulation of the chuck operating means at the top or upper end of the device. When using an elongated abrasive element or any other comparatively long implement which must be repositioned in the chuck to compensate for wear thereof, the bore serves as a magazine for such implement and permits of such feeding or repositioning at will. Preferably, a tubular shaft with circular or polygonal internal section, extends through the armature at the axis thereof and terminates at the ends of a housing forming the body of the device. The chuck operating means preferably includes a tubular member extended through said tubular shaft and adapted to longitudinally adjustably receive a part of an elongated implement held in the chuck as aforementioned, said tubular member being extended from the upper end of the housing and operable at such point for releasing and setting the chuck.

Referring to the drawing—

Fig. 1 is a side elevation of a motorized hand tool embodying my invention with parts shown broken away and other parts shown in section for clarity of illustration;

Fig. 2 is an enlarged fragmentary sectional view showing a detailed construction of the device at opposite ends thereof and showing in dotted lines the manner of use of an elongated abrasive element or implement.

One embodiment of my invention as shown in detail in the accompanying drawing, generally comprises an elongated housing A constructed so that it may be conveniently held in the hand of the user and adapted to contain the parts and elements of the device hereof. Mounted in an enlargement 3 formed at one end of the housing A is an electrical motor M having its armature N formed with an axial bore which aligns with a tubular chuck holder H mounted at the other end of the housing. Extending through the axial bore of the armature and from front to rear of the housing is a tubular drive shaft D which is fixed for rotation with the armature and drivingly connected with the chuck holder 11. At the opposite ends of the housing are suitable bearings 4 and 5. The shaft D and chuck holder H form a bore extending entirely through the device and open at opposite ends thereof.

As here shown the chuck C is of the collet type and positioned with the holder H so as to be driven thereby. This holder has a sleeve portion 7 telescoping the adjacent end of the shaft D in a pressed fit thereon so as to be drivingly engaged therewith, it being possible to remove the chuck holder if desired so that other types of chucks may be fitted upon the shaft in similar manner. The chuck C is operated by being longitudinally adjusted in the holder H and therefore is provided with a screw-threaded inner terminal 8 which is engaged with the internally screw-threaded end of a tubular operating member 9 rotatable within the shaft D and extending outwardly beyond the bearing 5. The outwardly extending portion of the tubular operating member 9 is provided with a knob or handle 10 secured thereto in any suitable manner so as to provide for turning of the member 9 for releasing and setting the chuck. It is noted that the knob 10 is engaged as at 11 with a sleeve 12 of the bearing assembly and does not contact the rotary shaft D nor bearings proper. This upon turning the knob 10 the part 11 thereof turns against the sleeve 12 and the member 9 is rotated whereby the chuck C will be longitudinally moved in the holder H, due to the screw threaded of the chuck with said member 9. In this manner the chuck may be set and released.

It should be noted that the tubular member 9 has its bore in alignment with the bore of the chuck C whereby certain implements may be inserted into the chuck from either end. Where the implement is of greater length than the chuck it is seen that a part thereof will extend into the bore of the member 9. This arrangement is illustrated by dotted lines in Figure 2 wherein for example the elongated implement may comprise an eraser or like abrasive element and extends the full length of the bore and coaxially with the device. As this and similar tools must be repositioned from time to time to compensate for wear, this can be readily accomplished by releasing the chuck, allowing the implement to gravitate into new position or be pushed into such position and then reclamping the chuck. In this case, it is seen that the bore through the device constitutes a magazine for the part of the elongated implement extending into the tubular member 9.

It should be noted that the housing A is provided with suitable switch S externally operable for starting and stopping the motor. Furthermore, the housing is provided with ventilation openings 12 with which a fan 13 on the shaft D will cooperate to prevent overheating of the device.

It will now be seen that by employing a small elongated housing such as the one here shown and mounting a motor at one end and a chuck at the other and drivingly connecting the chuck with the motor by means of a tubular shaft which is coaxial with the armature and chuck, I am able to provide a light, compact, and efficient motorized hand tool which will permit of use of a greater variety of tools or implements of lengths less than or greater than that of the device itself and accomplish the objects and purposes hereinbefore stated in a particularly efficient manner. It should also be noted that the means for operating the chuck is particularly advantageous in that although it extends through the tubular shaft and is operable from the upper end of the device it does not interfere with the adjustable mounting in the axial bore of the device of an elongated tool which is held by the chuck.

Preferably, the end of the housing in which the chuck is mounted is open and formed with internal screw-threads 14 adapted to receive an annular nut 15 which holds the bearing 4 in place and also retains in a counter bore 16 thereof an oil felt seal 17 which surrounds the sleeve-like end 7 of holder H.

I claim:

1. A motorized hand tool comprising a housing having openings at opposite ends, a motor in said housing, a chuck extending into the opening at one end of the housing and having an implement receiving bore, a tubular shaft drivingly connected with said motor and chuck in coaxial relation thereto and extending into the opening at the other end of the housing, and chuck setting and releasing means including a tubular member having a tool receiving bore and connected with said chuck and extending through said shaft so as to be operable at said other end of said housing for operating the chuck.

2. A motorized hand tool comprising a housing, a motor therein, a chuck mounted at one end of the housing, a shaft drivingly connected with said motor and said chuck, and means operable at the other end of the housing for setting and releasing said chuck, said shaft being tubular, said chuck setting and releasing means including a tubular member rotatable within and relative to said shaft for operating said chuck and being open at both ends so that its bore may receive a tool therein.

3. In a motorized hand tool, a housing, a motor therein, a chuck mounted at one end of the housing, a tubular drive shaft operatively connecting said chuck and motor and having the bore thereof coaxial with the bore of the chuck and open at both ends for reception of an elongated implement which may be mounted in said chuck and means operable at the other end of the housing for setting and releasing said chuck.

4. A device of the character described including a housing open at both ends, a tubular chuck holder mounted in and extending outwardly from one end of the housing, bearings adjacent ends of said housing, a motor mounted in said housing between said bearings, a tubular open ended shaft extending through and fixed to the armature of said motor and supported in said bearings with one open end in driving engagement with said holder and its other open end disposed adjacent the other end of said housing, a chuck mounted in said tubular holder for rotation therewith and longitudinal movement relative thereto and having its bore coaxial with that of said shaft for forming therewith a tool receiving bore opening at the ends of the housing, and means for longitudinally adjusting said chuck for setting and releasing it.

5. A device of the character described including a housing open at both ends, a tubular chuck holder mounted in and extending outwardly from one end of the housing, bearings adjacent ends of said housing, a motor mounted in said housing between said bearings, a tubular open ended shaft extending through and fixed to the armature of said motor and supported in said bearings with one open end in driving engagement with said holder and its other open end disposed adjacent the other end of said housing, a chuck mounted in said tubular holder for rotation therewith and longitudinal movement relative thereto and having its bore coaxial with that of said shaft for forming therewith a tool receiving bore opening at the ends of the housing, and means for longitudinally adjusting said chuck for setting and releasing it, including a tubular member open at both ends and rotatable within said shaft with its bore coaxial with that of the chuck and the openings at the ends of the housing, said tubular member and chuck having threadedly engaged terminals providing for longitudinal movement of the chuck upon rotation of said tubular member, and a knob on said tubular member by which the latter is turned, said knob having an inner end portion adapted to abut a portion of one of said bearings.

LOUIS J. MISURACA.